United States Patent [19]
Yang et al.

[11] Patent Number: 5,567,559
[45] Date of Patent: Oct. 22, 1996

[54] ELECTROPHOTOGRAPHIC PHOTORECEPTORS CONTAINING TITANYL PHTHALOCYANINE PROCESSED THROUGH AMMONIATED COMPLEX, AND METHOD FOR PRODUCTION THEREOF

[75] Inventors: Chen-Jen Yang, Hsinchuang; Tsong-Shin Jean, Hsinchu; Lung-Tarn Wu, Ping Tung Hsien; Ching-Liang Yang, Hsinchu; Kuei-Fei Teng, Kaohsiung, all of Taiwan

[73] Assignees: Sinonar Corp., Hsinchu; Industrial Technology Research Institute, Hsinchu Hsien, both of Taiwan

[21] Appl. No.: 420,180

[22] Filed: Apr. 11, 1995

[51] Int. Cl.$^6$ ................................ G03G 5/06
[52] U.S. Cl. .............. 430/58; 430/78; 430/135; 540/141
[58] Field of Search ................ 540/141, 143; 430/76, 78, 135

[56] References Cited

U.S. PATENT DOCUMENTS

| | | | |
|---|---|---|---|
| 4,728,592 | 3/1988 | Ohaku et al. | 430/59 |
| 4,898,799 | 2/1990 | Fujimaki et al. | 430/59 |
| 5,114,815 | 5/1992 | Oda et al. | 430/58 |
| 5,132,197 | 7/1992 | Iuchi et al. | 430/76 |
| 5,225,551 | 7/1993 | Duff | 540/141 |
| 5,298,617 | 3/1994 | Nukada et al. | 540/141 |
| 5,330,867 | 7/1994 | Hsiao et al. | 430/78 |
| 5,405,954 | 4/1995 | Liebermann et al. | 540/143 |

*Primary Examiner*—John Goodrow
*Attorney, Agent, or Firm*—W. Wayne Liauh

[57] ABSTRACT

An ammonia-modified titanyl phthalocyanine for use in preparing charge generating layer of a photoreceptor is disclosed. The ammonia-modified titanyl phthalocyanine is obtained by a process comprising the following steps: (a) reacting titanium tetrachloride with halogen-containing naphthalene to obtain an unmodified titanyl phthalocyanine; (b) dispersing the unmodified titanyl phthalocyanine in an organic solvent; and (c) subjecting the unmodified titanyl phthalocyanine to an ammonia-induced complexation-mediated crystal transformation so as to obtain the ammonia-modified titanyl phthalocyanine. The ammonia-induced complexation-mediated crystal transformation step can be achieved by either bubbling ammonia gas through the titanyl phthalocyanine-containing organic solution or by adding an ammonia-saturated aqueous solution to the titanyl phthalocyanine-containing organic solution. The ammonia-modified titanyl phthalocyanine is characterized by having Bragg diffraction angles of 7.5, 9.3, 13.6, 14.3, 17.9, 24.0, 27.2, and 29.1 degrees, and vibrational absorption resonances at 1492 cm$^{-1}$, 1416 cm$^{-1}$, 1333 cm$^{-1}$, 1120 cm$^{-1}$, 1072 cm$^{-1}$, 962 cm$^{-1}$, 894 cm$^{-1}$, 752 cm$^{-1}$, and 731 cm$^{-1}$. The photoreceptor shows excellent spectral sensitivity at wavelengths in the near-infrared range (750–825 nm), and excellent cyclic stability evidenced by the observed negligible changes in the dark development potential after prolonged exposure cycles.

26 Claims, 11 Drawing Sheets

ELECTROPHOTOGRAPHIC PHOTORECEPTORS CONTAINING TITANYL PHTHALOCYANINE PROCESSED THROUGH AMMONIATED COMPLEX, AND METHOD FOR PRODUCTION THEREOF

FIELD OF THE INVENTION

This invention relates to improved photoreceptors for use in electrophotographic devices. More specifically, the present invention relates to improved photoreceptors containing modified titanyl phthalocyanine for use in electrophotographic devices such as copiers and laser printers.

BACKGROUND OF THE INVENTION

Photoreceptor is the main component responsible for the formation of images in electrophotographic processes that take place in copiers and laser printers. There are two main types of photoreceptors: those containing inorganic photoconductive materials and those containing organic photoconductive materials. Inorganic photoconductive materials, such as selenium, silicon, and alloies of arsenic and selenium, have been developed and used as photoreceptors in electrophotography. Although appreciable sensitivity can be achieved, the inorganic photoconductive materials suffer from several major drawbacks, such as toxicity and high cost of production. Organic photoconductive materials, on the other hand, offer many attractive features that include relatively low cost, nontoxicity, broad spectral response ranging from visible to near-infrared light, and flexibility of being able to vary their molecular structure and photoconductive properties. A charge-transfer complex of poly(vinyl carbazole) and trinitrofluorenone was the first commercial organic photoreceptor used in copiers. Subsequent research work on organic photoconductive materials has resulted in the development of an aggregated photoconductor based on thiapyrylium salt. Major research efforts have been directed to the enhancement of efficiency of charge supply in organic photoconductive materials.

Stringent requirements are imposed on the photoconductive as well as mechanical properties of electrophotographic photoreceptors. Suitable candidate materials for use as photoreceptors are required to exhibit, not only efficient charge generation and charge transport properties, but also structural integrity and robustness so as to withstand mechanical abrasion during image development cycles. Most commercial copiers and laser printers nowadays have used function-separated photoreceptors to achieve the various requirements. In dual-layer photoreceptors, a charge generation layer and a charge transporting layer are constructed separately and, therefore, versatile choices can be made for photoreceptors to achieve the desired and improved performance. Organic compounds such as azo, bisazo, and perylene pigments are usually chosen as the charge generation material for photoreceptors that are sensitive to visible light. For printers that utilize semiconductor lasers or light-emitting diodes as the light source, photoreceptors are required to be photosensitive to near-infrared beam in the wavelength range of 750 nm to 850 nm. In this category, metal-free phthalocyanines, metallophthalocyanines, and squaraines have been found to exhibit substantial photosensitivity in the near-infrared ranges.

Among the infrared-sensitive organic materials, titanyl phthalocyanines are especially of interest because of their high efficiency of charge generation. The structure of titanyl phthalocyanine is shown in FIG. 1. It was reported that the efficiency of charge generation of titanyl phthalocyanine can reach as high as 94%. It is of technological as well as commercial interests to develop methods that can cost-effectively mass produce the highly infrared-sensitive titanyl phthalocyanine, with consistent and further improved quality, for use as efficient electrophotographic photoreceptors.

The efficiency of charge generation of titanyl phthalocyanine was found to be strongly dependent on its crystal structure. Most of the reported methods for modifying the crystal structure of titanyl phthalocyanines involve an initial acid-pasting treatment step, in which strong protonic acids, such as sulfuric acid and trifluoroacetic acid, are used to dissolve the titanyl phthalocyanine material, and the resultant solution was subsequently precipitated in a nonsolvent such as water, to obtain amorphous powder of titanyl phthalocyanine. Another method for modifying the crystal structure of titanyl phthalocyanines utilizes the ball milling of the dry titanyl phthalocyanine material; this method was shown to have the same effect to obtain the amorphous phase titanyl phthalocyanine.

The essence of the methods reported in the art for the modification of the crystal structure of titanyl phthalocyanine lies in the subsequent solvent treatment of the amorphous titanyl phthalocyanine. Effective organic solvents include halogen-containing hydrocarbons, such as monochlorobenzene, dichlorobenzene, and dichloroethane, etc.; and ethers such as n-butyl ether, tetrahydrofuran and ethylene glycol n-butyl ether, etc.

In U.S. Pat. No. 5,132,197, it was disclosed that highly photoconductive titanyl phthalocyanine can be obtained by treatment with methanol, followed by a wet milling in n-butyl ether or pinene or ethylene glycol n-butyl ether. In U.S. Pat. No. 5,225,551, it was disclosed that the preferred crystal forms of titanyl phthalocyanine can be obtained by precipitation of titanyl phthalocyanine in trifluoroacetic acid/methylene chloride solution with a nonsolvent such as methanol/water with varying volume ratios. Another method that involves wet milling of titanyl phthalocyanine in solvents such as dichloroethane and dichlorobenzene in a wet cake form after precipitation with water was reported in U.S. Pat. Nos. 4,898,799 and 5,114,815. The importance of the presence of water during the modification of crystal forms of titanyl phthalocyanine was further addressed in U.S. Pat. No. 5,298,617. A number of other reports also disclosed that water molecules might have actually become associated with titanyl phthalocyanine after the treatment processes reported in the prior art.

Although highly photoconductive titanyl phthalocyanines have been reported in the art, the mechanism of crystal transformation and the role of different solvent media remained unclear in the above-mentioned prior art disclosures. Furthermore, the possibility of water doping on the titanyl phthalocyanine molecule cannot be neglected. It was also shown in many reports that the electric conductivity of titanyl phthalocyanine and other related phthalocyanines has increased after treatment with water since water, like oxygen, can oxidize the titanyl phthalocyanine material. Therefore, it can be expected that the dark decay may become a serious problem when the water-treated titanyl phthalocyanine is used as the charge generation component of the photoreceptor. The adverse effect of substantial dark decay associated with the titanyl phthalocyanine produced by the prior art processes will cause undesirable foggy images to be produced in the printed copies.

SUMMARY OF THE INVENTION

The present invention is the result of many years of dedicated research efforts by the co-inventors, who initially had attempted to obtain a comprehensive understanding by which the modification of crystal forms may be related to the hydrogen bonding interaction between titanyl phthalocyanine and the solvent medium in which the titanyl phthalocyanine is dissolved. After many years of careful studies, it was concluded by the co-inventors that a favorable configuration resulting from the transformation of crystal forms can be induced by treating the titanyl phthalocyanine with certain organic solvents. More importantly, it was concluded by the co-inventors that a polar solvent medium, which can trigger hydrogen bonding interaction among titanyl phthalocyanine molecules, will be needed to effectuate the production of titanyl phthalocyanine having a highly photoconductive crystal form.

Based on the above observations, a complexation technique, which involves hydrogen bonding interaction between titanyl phthalocyanine and ammonia molecules, was developed in this invention which has been shown to be more effective, or at least equally effective, in modifying the crystal structure of titanyl phthalocyanine relative to the previously reported methods. However, unlike the prior art processes, which involve the treatment with water, the method disclosed in the present invention involves the association of ammonia with titanyl phthalocyanine, and is a completely reversible process. As a result, a dramatic improvement in the quality of titanyl phthalocyanine was obtained with the complexation-mediated crystal transformation method disclosed in the present invention.

Therefore, the primary object of the present invention is to develop a cost-effective method for improving the properties of titanyl phthalocyanine for use in photoreceptors. More specifically, the primary object of the present invention is to develop an effective method for the refinement of the crystal forms of titanyl phthalocyanine for use in photoreceptors in electrophotographic devices. The refined titanyl phthalocyanine exhibits a preferred crystal form such that its photosensitivity is significantly enhanced.

In the method disclosed in the present invention, the refinement of the crystal form of the titanyl phthalocyanine is accomplished by the formation of a novel complex consisting of titanyl phthalocyanine and ammonia in appropriate organic solvents. The ammoniated complex, which is an intermediate product during the refinement process of the present invention, enables hydrogen bonding type interaction between adjacent titanyl phthalocyanine molecules as exemplified in FIG. 2. FIG. 2 shows the structure of, and the intermolecular interaction within, a stoichiometric complex consisting of titanyl phthalocyanine and ammonia.

Another object of the invention is to fabricate an electrophotographic photoreceptor which exhibits excellent photosensitivity in the near-infrared wavelength range and maintains persistent optoelectronic response without deterioration of sensitivity in repeated uses. To this end, a layered configuration as shown in FIG. 3 is constructed. On top of a conducting substrate (shown as numeral 1 in FIG. 3), an intermediate layer (shown as numeral 2 in FIG. 3), a charge generation layer (shown as numeral 3 in FIG. 3), and a charge transporting layer (shown as numeral 4 in FIG. 3) are formed in a consecutive order. The refined titanyl phthalocyanine is used as the charge generation material in the layered photoreceptor to achieve enhanced photosensitivity.

BRIEF DESCRIPTION OF THE DRAWINGS

The present invention will be described in detail with reference to the drawing showing the preferred embodiment of the present invention, wherein.

DETAILED DESCRIPTION OF THE PREFERRED EMBODIMENT

The present invention discloses an economically scalable processing method for the production of highly photoconductive titanyl phthalocyanine. This was accomplished by developing a novel complexation technique in which ammonia gas or an aqueous solution of ammonia was used to modify the intermolecular interaction between titanyl phthalocyanine molecules. As a result of this modification, a preferred crystal form of titanyl phthalocyanine was produced which exhibited a remarkably enhanced photosensitivity.

In one preferred embodiment of the present invention, ammonia gas was purged through a solution containing titanyl phthalocyanine in n-butyl ether. This was done by bubbling ammonia gas through a gas distributor to the solution. When the ammonia gas was continuously being introduced from the bottom of the reaction vessel containing the titanyl phthalocyanine in n-butyl ether solution, mechanical stirring was maintained to achieve efficient mixing between the ammonia gas and the titanyl phthalocyanine solution. In the aforementioned titanyl phthalocyanine solution, a ratio about 50:1 to 1:1 by weight, or preferably about 10:1 by weight, of n-butyl ether to titanyl phthalocyanine was selected. The flow rate of ammonia gas was regulated in the range of 200 to 500 cc./min. The reaction was continued for 10 hrs.

Another embodiment of the present invention employed an aqueous solution of saturated ammonia (about 30 wt %) in place of ammonia gas for the transformation of crystal forms of titanyl phthalocyanine. This was achieved by adding the aqueous solution of ammonia to a solution containing titanyl phthalocyanine in n-butyl ether, such that the weight ratio of the two solutions was about 1:10 to 10:1, or preferably about 1:1. The reaction was performed under vigorous stirring by a mechanical stirring device such as a paint shaker or an attritor. In the case of using a paint shaker, glass beads of about 1 mm size were used to assist the mixing.

Other embodiments of the present invention utilized alternative organic solvents such as dichlorobenzene and monochlorobenzene, in place of n-butyl ether. The ratio between the reaction reagents was in the same range as that described above. The complexation reaction was performed using a procedure similar to that described in the above two embodiments.

Figure 1:
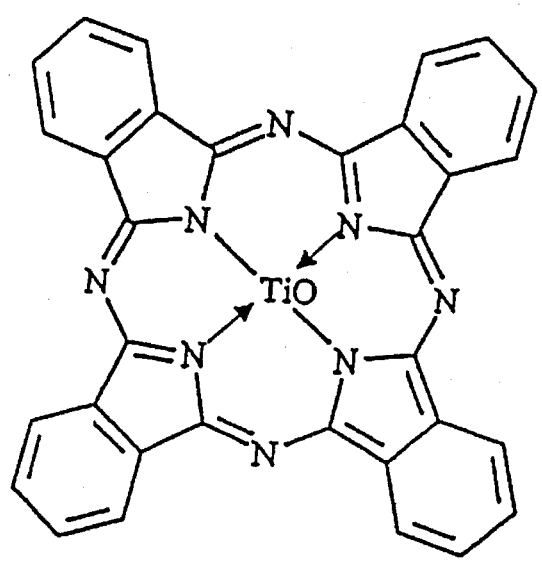
FIG. 1 shows the structure of titanyl phthalocyanine.
Figure 4:
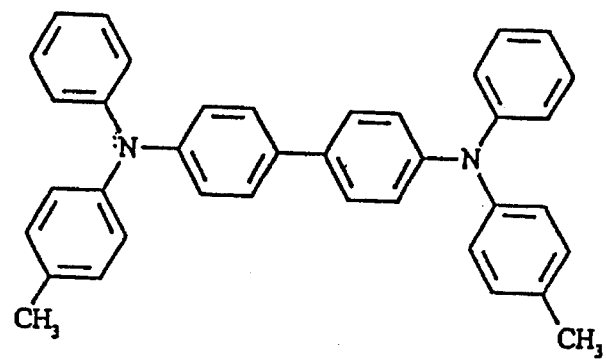
FIG. 4 shows the structure of a charge transporting material, triphenyldiamine (ST 16/1).
Figure 2:
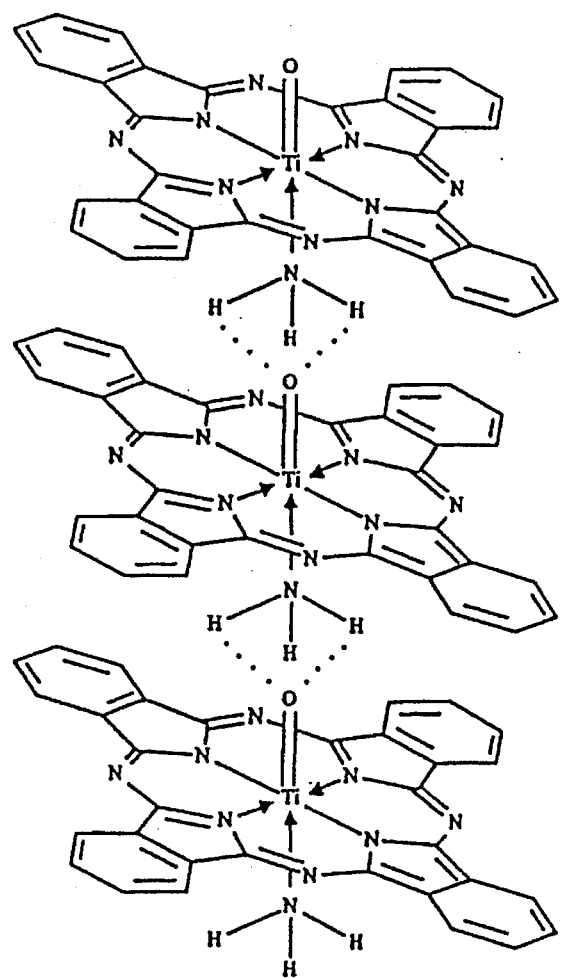
FIG. 2 shows the structure of the stoichiometric ammoniated complex of titanyl phthalocyanine.
Figure 3:
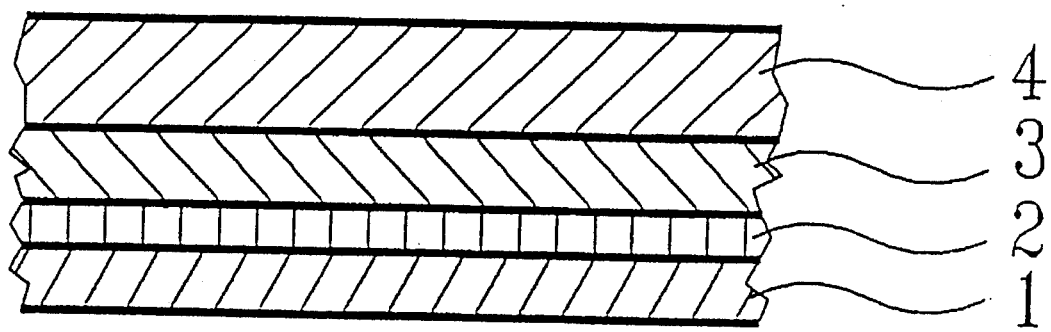
FIG. 3 is a schematic diagram of an electrophotographic photoreceptor.
Figure 5:
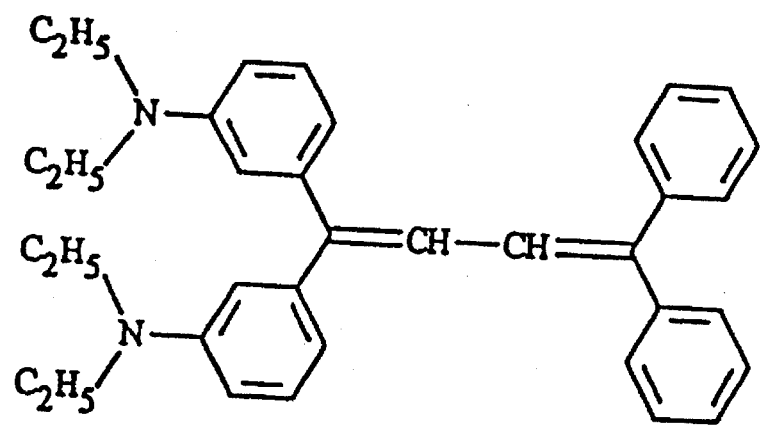
FIG. 5 shows the structure of another charge transporting material, butadiene-linked diamine (CT 405).

In the preparation of electrophotographic photoreceptors, an intermediate layer, a charge generation layer, and a charge transporting layer were formed consecutively on the outer surface of a cylindrical aluminum drum by dip coating of solutions of respective materials in appropriate organic solvents. A copolyamide was used as the material for the intermediate layer to achieve good adhesion between the organic layer and the conducting substrate, and to block free charge carriers injected from the conduction substrate. The thickness of the intermediate layer was fixed in the range of 0.5 μm to 5 μm, and preferably between 1 μm and 2 μm, for optimum performance. 3.5 parts by weight of titanyl phthalocyanine, 2 parts by weight of poly(vinyl butyral), 95 parts by weight of cyclohexanone, and 100 parts by weight of methyl ethyl ketone (MEK) were used to prepare the coating solution for making the charge generation layer. The thickness of the charge generation layer was maintained in the range between 0.1 μm and 2 μm, and preferably between 0.2 μm and 1 μm. A triphenyldiamine (trade name ST16/1, purchased from H. W. Sands Corp.), whose structure is shown in FIG. 4, was used as the charge transporting material. Other effective charge transporting materials can also be used, and their structures are shown in FIG. 5 (Tradename CT-405, purchased from Anan Corp.) and FIG. 6 (a hydrazone), respectively. The charge transporting layer was coated with a solution containing a charge transporting material and a polycarbonate dissolved in toluene. The thickness of the charge transporting layer was in the range between 10 μm and 30 μm, and preferably between 15 μm and 25 μm.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

Material Preparation And Instrumental Characterization

Titanyl phthalocyanine was synthesized according to published literature methods. To a 300 milliliter three-neck flask fitted with condenser, thermometer, and mechanical stirrer was added phthalodinitrile (38.6 g, 301.6 mmol) and 134 ml 1-chloronaphthalene. The mixture was heated to 60° C. under nitrogen atmosphere and then titanium tetrachloride (12.9 g, 68.2 mmol) was added. Thereafter, the reaction mixture was heated slowly to 200° to 220° C. and maintained at that temperature range for 3 hrs to complete the reaction. The mixture was left to cool to room temperature and then 80 ml of methanol was added to precipitate the titanyl phthalocyanine product. After stirring for 1 hr, the resulting precipitate was collected by filtration, followed by successive washing of warm methanol (4×150 ml), warm deionized water (4×150 ml), and methanol (3×100 ml). The reaction product containing titanyl phthalocyanine was dried at 50° C. under vacuum overnight to afford dark-blue powder of titanyl phthalocyanine (27.2 g, 47.2 mmol).

The composition of titanyl phthalocyanine was determined by elemental analysis, and the result is shown as follows:

|  | C% | H% | N% |
| --- | --- | --- | --- |
| calculated | 66.68 | 2.80 | 19.44 |
| found | 65.83 | 2.94 | 19.04 |

The close agreement between the calculated and found compositions indicates high purity of the synthesized titanyl phthalocyanine.

Figure 7:
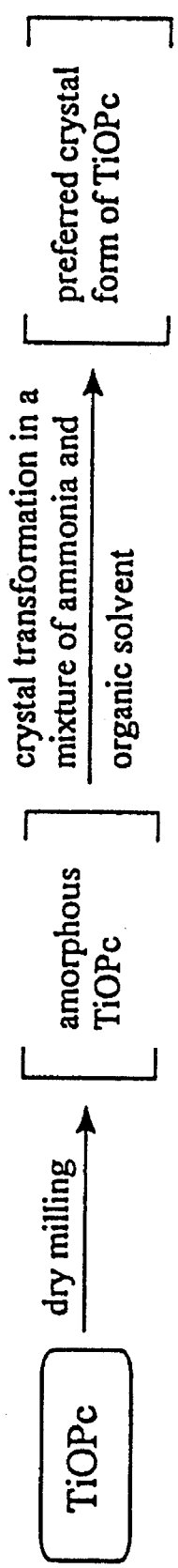
FIG. 7 is a schematic diagram of the steps of a complexation-mediated crystal transformation process.

The transformation of the crystal structure of titanyl phthalocyanine was performed by our novel processing method as depicted in FIG. 7. Initially, the as-synthesized product was subjected to a ball mill containing glass beads therein having the size (diameter) of about 1 cm for 6 days at room temperature to obtain amorphous titanyl phthalocyanine. The amorphous titanyl phthalocyanine was then washed with methanol. After prolonged drying at 70° C. under vacuum for 12 hrs, the titanyl phthalocyanine material was processed by the aforementioned complexation technique to refine its crystal structure.

The refined titanyl phthalocyanine was characterized by x-ray powder diffraction (XRPD), Fourier transform infrared (FTIR) spectroscopy, and optical absorption spectroscopy. XRPD was performed at room temperature in a 2θ range of 2 to 40 degrees with a Philips PW1700 x-ray diffractometer using 1.54-Å Cu Kα radiation. FTIR spectra of titanyl phthalocyanine were taken at room temperature with a JASCO-5300 spectrometer. Samples were in the form of KBr pellets. Optical absorption spectra were obtained for thin films of titanyl phthalocyanine dispersed in poly(vinyl butyral) with a Hitachi U-2000 spectrophotometer. The photosensitivity of the photoreceptors was characterized with a photo-induced discharge curve (PIDC).

EXAMPLE 1

10 g of the titanyl phthalocyanine synthesized above was ball milled in a container containing 1-cm glass beads for 6 days. The titanyl phthalocyanine material was then washed with 100 ml methanol. After filtration and thorough drying, the titanyl phthalocyanine material and 90 ml n-butyl ether were added to a 250-ml flask equipped with a mechanical stirrer and a gas distributor. The reaction was conducted at room temperature under constant ammonia gas flow at a rate of 300 cc./min. After a reaction time of 10 hrs, the modified titanyl phthalocyanine product was collected by filtration, followed by washing with MEK (3×200 ml). The titanyl phthalocyanine product was dried at 50° C. in vacuum to afford 8.5 g of fine blue powder of refined titanyl phthalocyanine.

Figure 8:
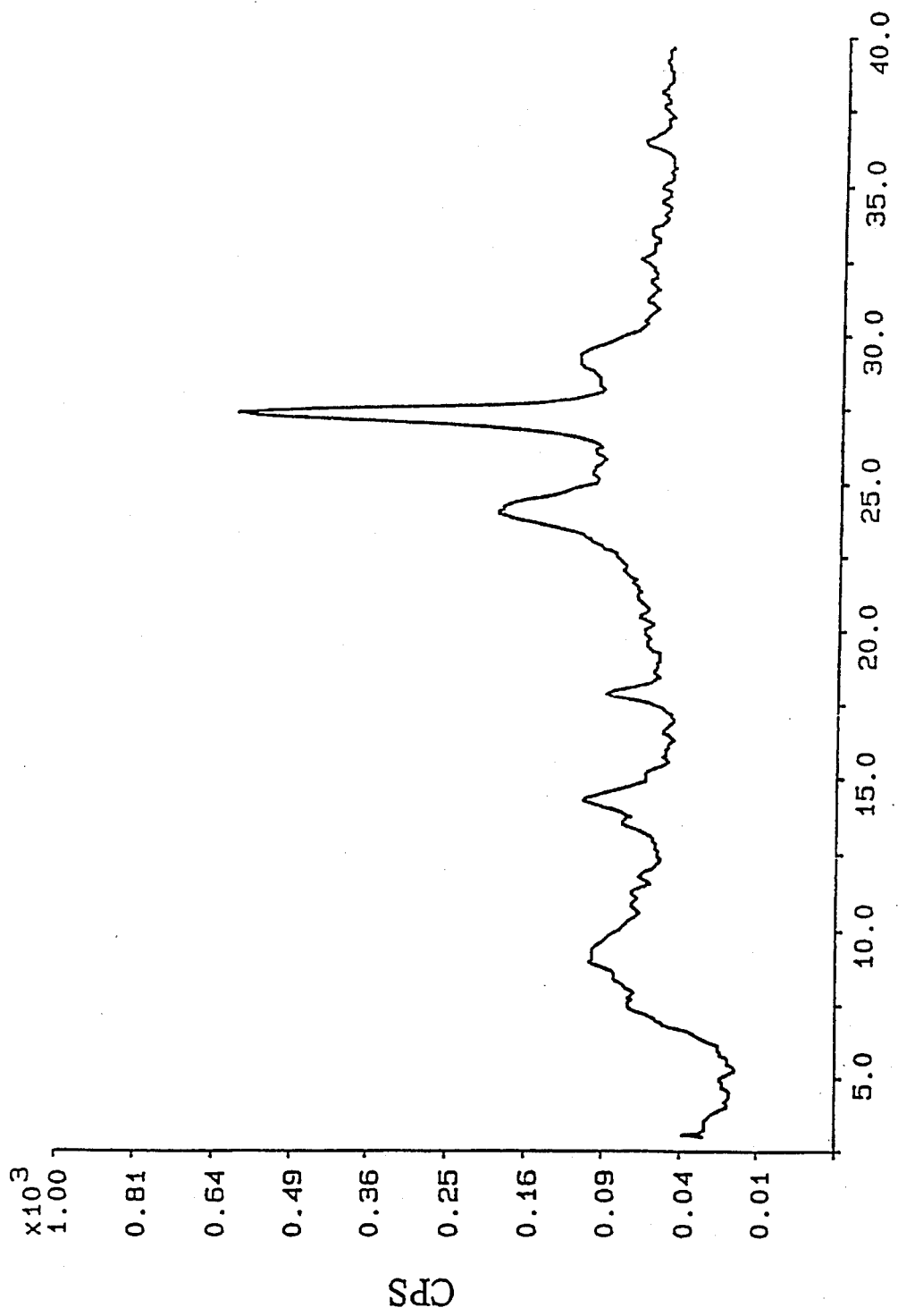
FIG. 8 is an X-ray powder diffraction pattern obtained from the refined titanyl phthalocyanine from Example 1.
Figure 9:
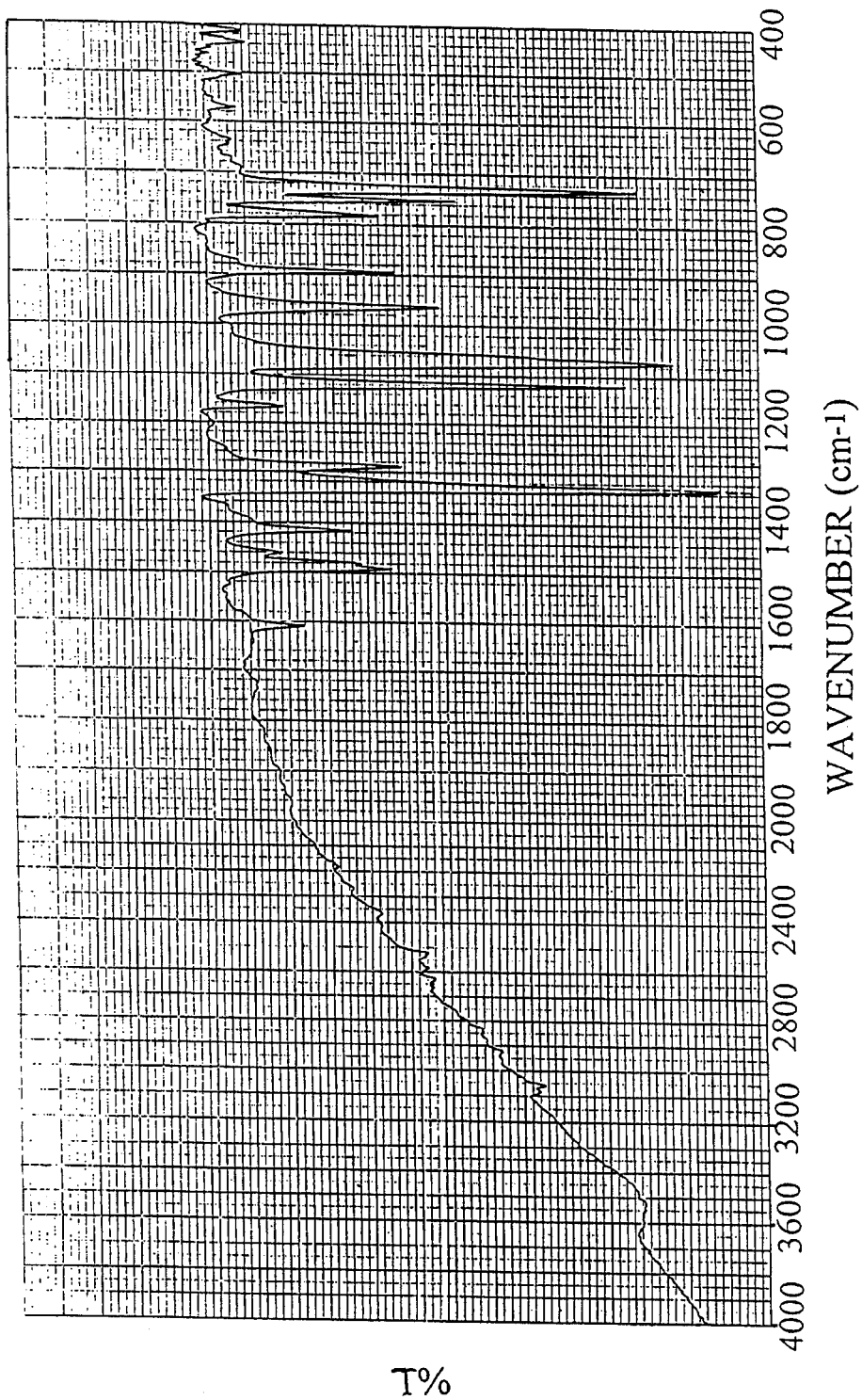
FIG. 9 is an FTLR spectrum for a KBr pellet obtained from the refined titanyl phthalocyanine from Example 1.

FIG. 8 is an XRPD pattern of the refined titanyl phthalocyanine which shows Bragg diffraction angles (2θ±0.2) of 7.5, 9.3, 13.6, 14.3, 17.9, 24.0, 27.2, and 29.1 degrees (the measuring device is subject to an accuracy of ±0.2 degrees). This XRPD pattern represents a unique crystal form compared to those disclosed in the various prior art patent documents. The FTIR spectrum of the refined titanyl phthalocyanine is shown in FIG. 9, which indicates vibrational absorption resonances at 1492 $cm^{-1}$, 1416 $cm^{-1}$, 1333 $cm^{-1}$, 1120 $cm^{-1}$, 1072 $cm^{-1}$, 962 $cm^{-1}$, 894 $cm^{-1}$, 752 $cm^{-1}$, and 731 $cm^{-1}$. The small but broad peak around 3500 $cm^{-1}$ can be attributed to the moisture contamination associated with KBr. No characteristic vibrational resonance related to $NH_3$ can be assigned to in FIG. 9, indicating complete removal of NH$_3$ from the refined titanyl phthalocyanine. This observation indicates that excellent quality of the refined titanyl phthalocyanine was obtained, and, therefore, side products and impurities which could lead to large dark decay, can be avoided in the subsequent preparation of photoreceptors.

Figure 10:
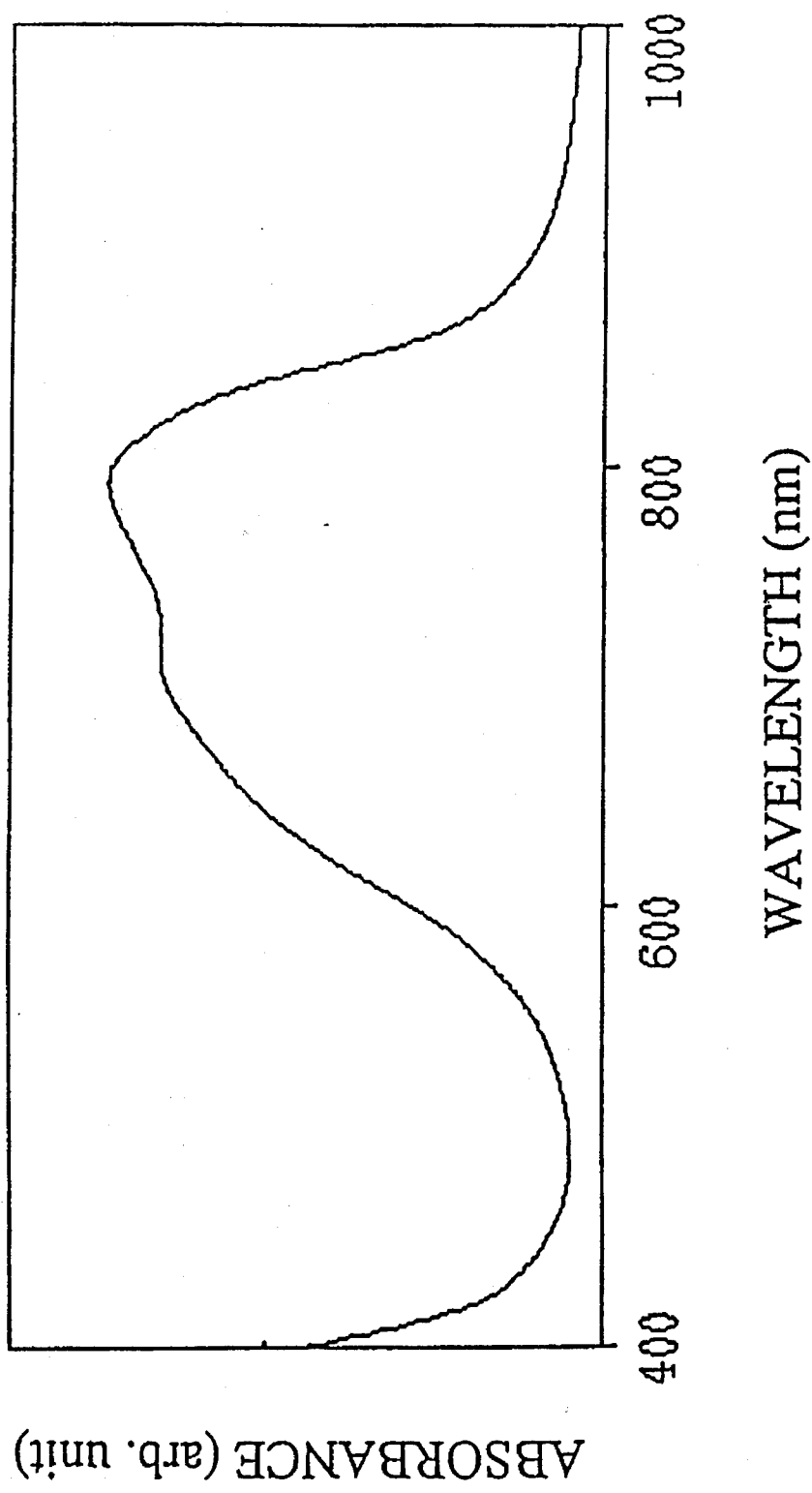
FIG. 10 is an optical absorption spectrum obtained from the refined titanyl phthalocyanine from Example 1.

5 g of the refined titanyl phthalocyanine obtained above was sand milled along with 28.6 g of cyclohexanone solution containing 10% by weight of poly(vinyl butyral) and 50 g of cyclohexanone for 3 days to obtain a fine dispersion of titanyl phthalocyanine having a particle size smaller than 0.3 µm. The solution was further diluted with 60 g cyclohexanone and 142.9 g MEK to complete the preparation of a coating solution for preparing the charge generation layer. Thin films for optical absorption measurement were prepared by spreading the solution on a glass substrate, followed by slow drying on a hot plate. The optical absorption spectrum of the refined titanyl phthalocyanine dispersed in poly(vinyl butyral) is shown in FIG. 10. The refined titanyl phthalocyanine obtained in this invention clearly exhibits a strong absorption peak at 790 nm and a shoulder around 715 nm. The intensity of the 790-nm peak is about 1.13 times that at 715 nm.

A photoreceptor was prepared by consecutive coatings of a 1.0-µm copolyamide layer, a 0.2-µm charge generation layer containing the refined titanyl phthalocyanine, and a charge transporting layer onto an aluminum substrate. The charge transporting layer was prepared using a toluene solution of ST 16/1 triphenyldiamine and a flexible polycarbonate (PCZ). The thickness of the charge transporting layer was about 20 µm.

The electrophotographic properties of the photoresponsive imaging members were determined by electrostatically charging the surface with a corona discharge source until the surface potential, measured by a potential probe attached to an electrometer, reached an initial dark value, $V_0$, of −700 volts. After resting for 2 seconds in the dark, the charged member reached a surface potential, $V_d$, which is called the dark development potential. The photoreceptor was subsequently exposed to filtered light (780 nm) emitted from a halogen lamp. The exposure to the emitted light was continued for 2 seconds and then a surface potential defined as the residual potential, $V_r$, was recorded. The dark decay in volts per second was calculated as $-(V_o-V_d)/2$. The half exposure energy, $E_{1/2}$ (µJ/cm$^2$), was determined by finding the amount of energy needed to reduce the $V_d$ to half of its initial value. $E_{1/2}$ is a value which indicates the photosensitivity of the photoreceptors. A lower $E_{1/2+cc}$ value indicates a higher sensitivity. Similarly, $E_{+c,fra\ 1/6}$, which was defined as the exposure energy required to reduce the $V_d$ to ⅙ of its initial value, was also determined.

Table 1 shows the electrophotographic electrical properties of the photoreceptor prepared as described above. The electrophotographic electrical properties of the photoreceptor of the present invention are characterized as having a dark decay value of 2.6 v/sec, a residual potential, $V_r$, of −9.8 volts, an $E_{1/2}$ value of 0.08 µJ/cm$^2$, and an $E_{1/6}$ value of 0.19 µJ/cm$^2$. A remarkably low dark decay was observed from the photoreceptor prepared in the present invention compared to those reported in the prior art. The low $E_{1/2}$ value of the photoreceptor of the present invention is among the best electrophotographic imaging members that have been reported so far. Further enhancement of photosensitivity can be achieved by increasing the thickness of the charge generation layer, however, at the expense of dark decay. For example, with a photoreceptor containing a 0.4-µm charge generation layer, the $E_{1/2}$ value was found to be 0.06 µJ/cm$^2$, and the dark decay was 10 v/sec.

Figure 11:
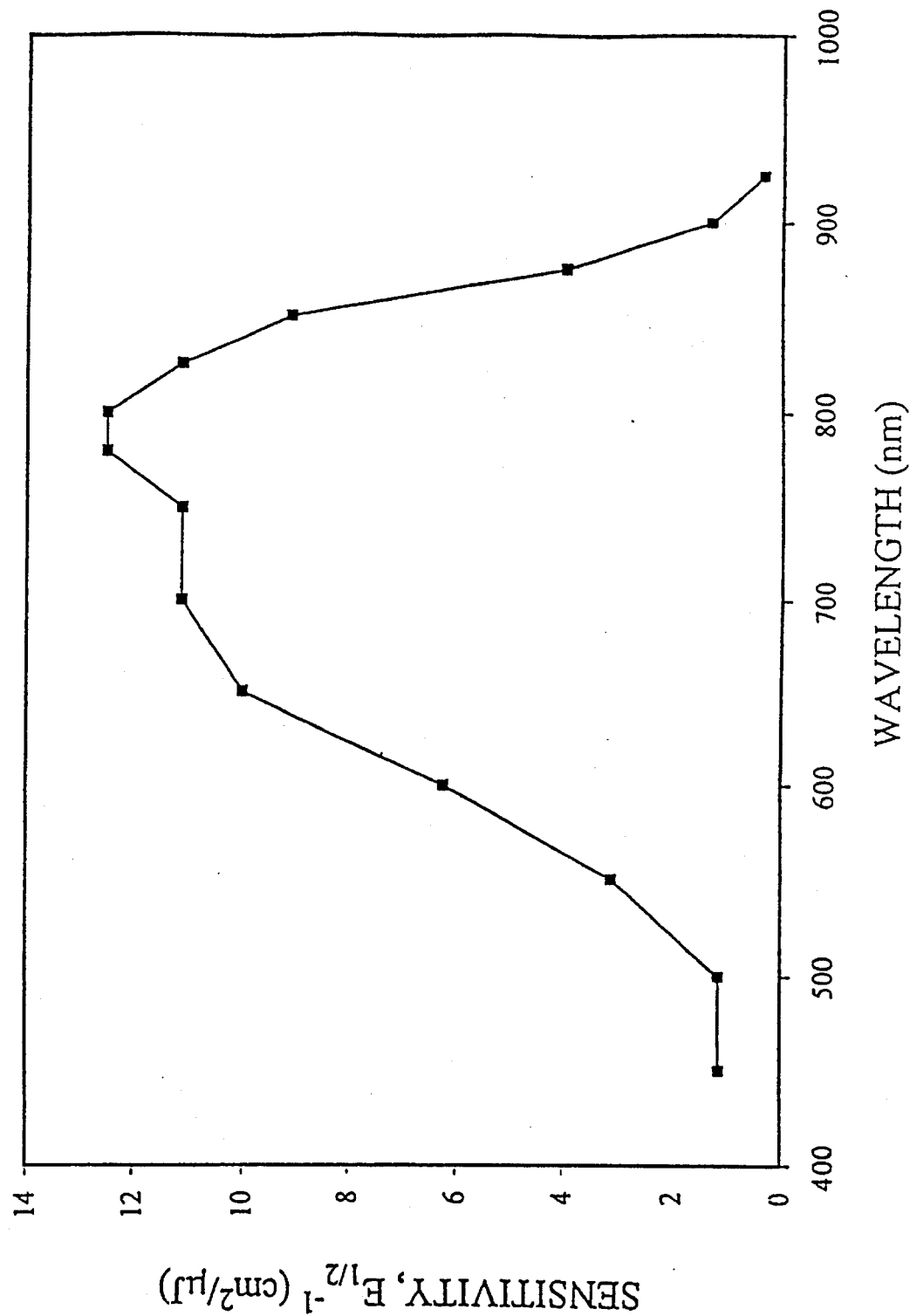
FIG. 11 is a plot of photosensitivity spectrum of the photoreceptor obtained from Example 1.

Spectral sensitivity of the photoelectric response was measured by selectively varying wavelengths of the light source in the range between 450 and 925 nm. It is shown in FIG. 11 that spectral sensitivity of the photoreceptor, which is expressed as the reciprocal of the half exposure energy ($E_{1/2}^{-1}$), maintained its maximal value in a wavelength range of 750 to 825 nm. The sensitivity spectrum (FIG. 11) corresponds well to the optical absorption spectrum of the titanyl phthalocyanine material (FIG. 10).

Cyclic stability of the photoreceptor was investigated by continuously performing charging/exposure/erasure cycles on the refined titanyl phthalocyanine sample. The conditions for the cyclic stability experiment were the same as those used in PIDC experiment. The cyclic stability was judged by the changes of dark development potential ($V_d$) after prolonged cycles, and of residual potential ($V_r$) after prolonged cycles. Table 2 shows the values of $_dV$ and $_rV$ after 5000, 10000, 15000, and 20000 cycles. Clearly, there were only negligible changes in $V_d$—all the deviations were within 5 volts. Residual potential ($V_r$) become more negative after the continuous exposures, but the changes (−9 to −34 volts) were also very small even after 20000 cycles. This observation indicates superior characteristics in photochemical stability of the photoreceptor using the refined titanyl phthalocyanine prepared in the present invention.

EXAMPLE 2

In this Example, titanyl phthalocyanine was processed using an alternative complexation method, which utilized an aqueous solution of saturated ammonia in place of the ammonia gas used previously. 10 g of the ball-milled phthalocyanine as described in Example 1 was mixed with 10 g of saturated aqueous solution of ammonia and 100 g of n-butyl ether. The mixture was subjected to a vigorous mechanical grinding using a paint shaker. After a processing time of 10 hrs, the product was collected by filtration and then washed successively with MEK (3×200 ml). The material was dried at 50° C. in vacuum overnight to afford 8.0 g of refined titanyl phthalocyanine.

Figure 12:
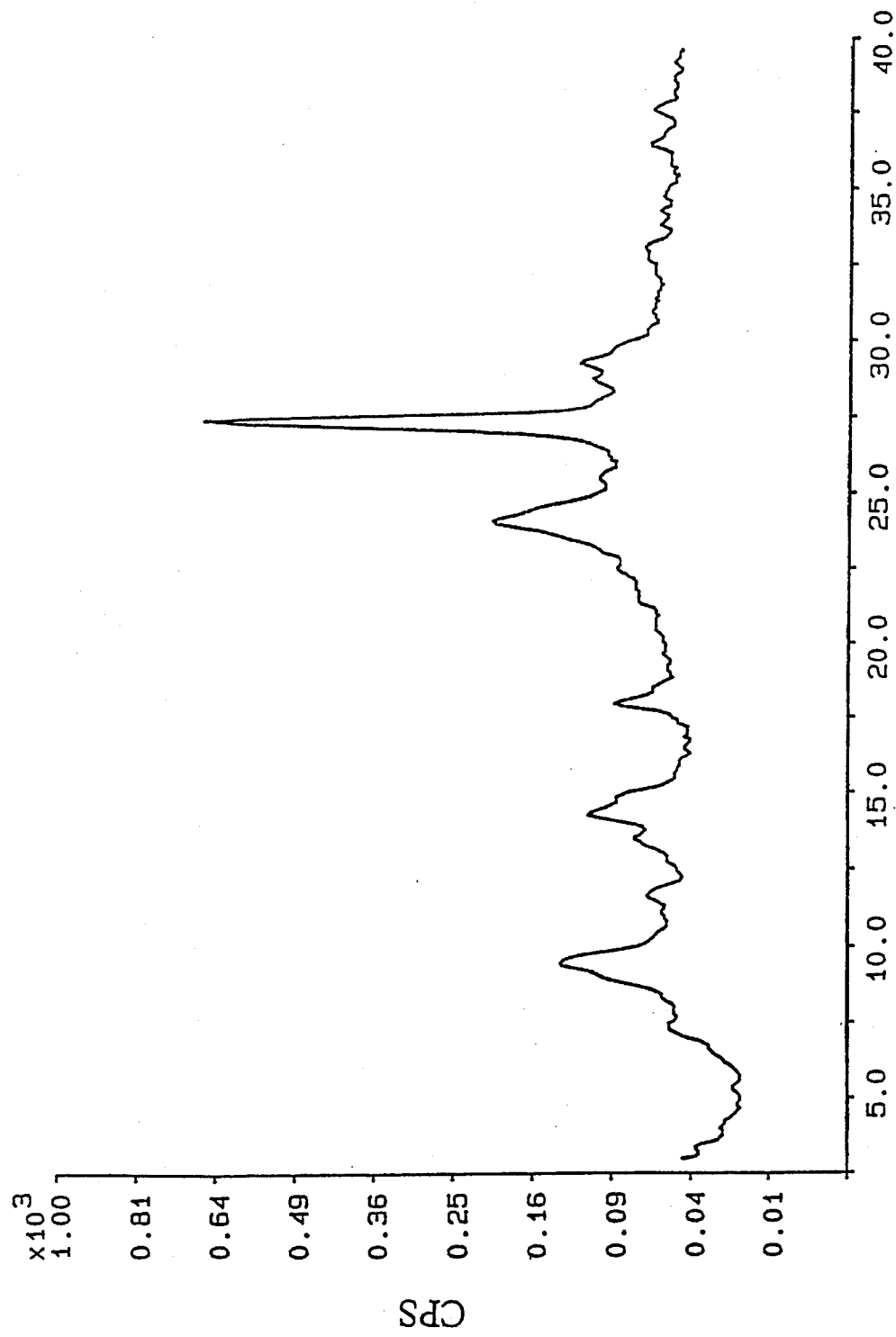
FIG. 12 is an X-ray powder diffraction pattern obtained from the refined titanyl phthalocyanine from Example 2.
Figure 13:
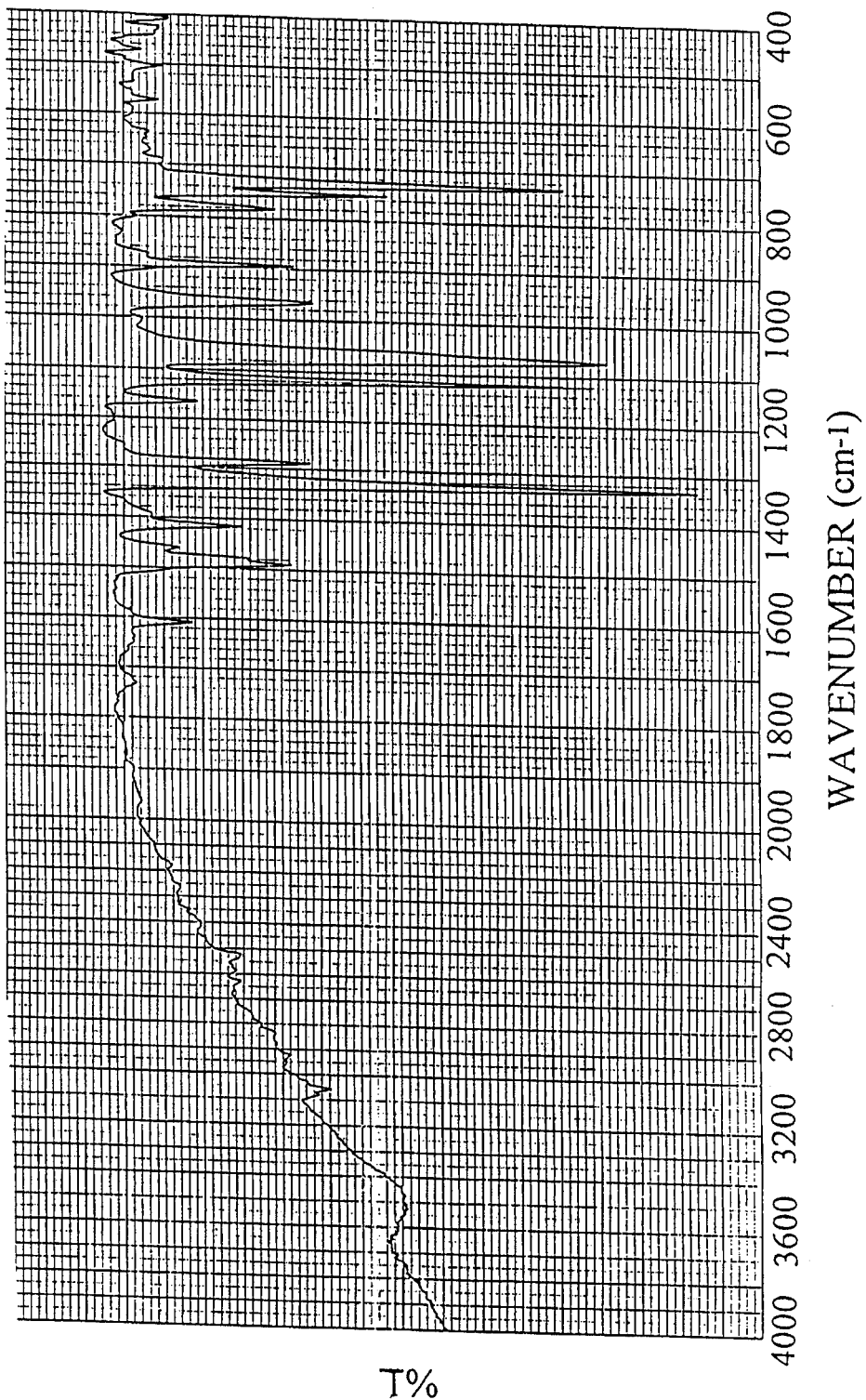
FIG. 13 is an FTIR spectrum for a KBr pellet obtained from the refined titanyl phthalocyanine from Example 2.
Figure 14:
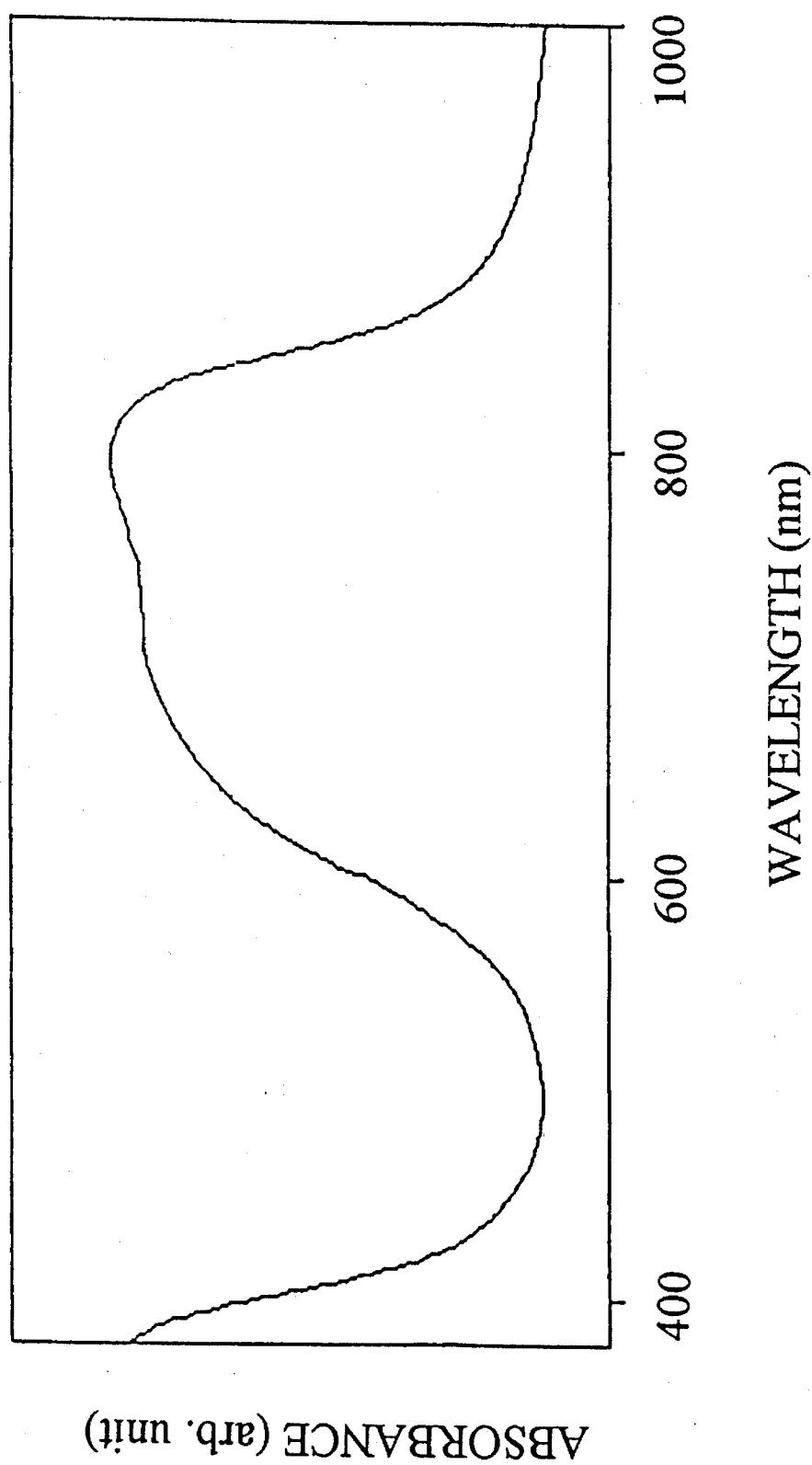
FIG. 14 is an optical absorption spectrum obtained from the refined titanyl phthalocyanine from Example 2.

FIG. 12, which shows an XRPD pattern of the refined titanyl phthalocyanine, exhibits Bragg diffraction angles (2θ±0.2) of 7.4, 9.5, 11.6, 13.6, 14.3, 17.9, 24.0, 27.2, and 29.1 degrees. The FTIR spectrum, which is shown in FIG. 13, indicates identical resonance peaks as those shown in FIG. 9. FIG. 14 shows the optical absorption spectrum obtained from a thin film made of the refined titanyl phthalocyanine dispersed in a matrix of poly(vinyl butyral). The ratio of titanyl phthalocyanine to poly(vinyl butyral) was 3.5:2 by weight. FIG. 15 shows a distinct absorption peak which appears at 795 nm and a shoulder which lies at about 720 nm. The relative intensity between the 795 nm absorption peak and the 720 nm absorption shoulder is 1.09 to 1.

An electrophotographic photoreceptor containing the refined titanyl phthalocyanine as the charge generation member was prepared according to the procedure described in Example 1. The electrophotographic electrical properties were measured by PIDC, and the results are summarized in Table 1. The photoreceptor prepared in Example 2 exhibited the same photosensitivity (0.08 µJ/cm$^2$) as that observed in Example 1. The dark decay (5.4 v/sec) was more than twice that in Example 1.

Comparative Example 1

To illustrate the enhancement of photosensitivity by the complexation-mediated crystal transformation process, we performed measurement of photoelectric properties of the originally synthesized titanyl phthalocyanine. This was done using the as-synthesized titanyl phthalocyanine as the charge generation member for the photoreceptor. Other factors, such as compositions and thickness of the layered members, were kept the same as those described in Example 1 and Example 2. As shown in Table 1, the dark decay, residual potential, $E_{1/2}$, and $E_{1/6}$ were determined to be 7.8 v/sec, −7.3 volts, 0.28 µJ/cm$^2$, and 0.76 J/cm$^2$, respectively. The photosensitivity of the as synthesized titanyl phthalocyanine, judged by $E_{1/2}$ and $E_{1/6}$ values, is significantly lower than that of the refined titanyl phthalocyanine. This observation confirms the remarkable improvement on photosensitivity using the complexation-mediated crystal transformation process disclosed in the present invention.

Comparative Example 2

Comparisons of photoelectric properties were also made between the photoreceptor revealed in U.S. Pat. No. 5,132,197 and that in the present invention. Preparation procedures for titanyl phthalocyanine as described in U.S. Pat. No. 5,132,197 were followed. N-butyl ether was used as the only solvent medium for the wet milling of titanyl phthalocyanine. Specifically, 10 g of titanyl phthalocyanine, which was initially treated with acid pasting and washed with methanol, was dispersed in 100 g of n-butyl ether and, subsequently, the mixture was subjected to mechanical grinding with 1 mm glass beads in a paint shaker for 10 hrs. The titanyl phthalocyanine was collected and used as a charge generation member in a photoreceptor prepared by a similar procedure as described in Example 1 and Example 2. The photoelectric properties of this photoreceptor are listed in Table 1, which shows a dark decay value of 7.3 v/sec, a residual potential of −10.7 volts, an $E_{1/2}$ value of 0.19 µJ/cm$^2$, and an $E_{1/6}$ value of 0.59 µJ/cm$^2$.

Comparative Example 3

Y-form titanyl phthalocyanine was prepared following the procedure revealed in U.S. Pat. No. 5,298,617. Specifically, 10 g of titanyl phthalocyanine that has been initially treated with acid pasting and washed with methanol was wet milled with 10 g of deionized water and 100 g of chlorobenzene in a paint shaker. The collected titanyl phthalocyanine was used as the charge generation member of a photoreceptor. For comparison purposes, the compositions and thickness of the layered members were fabricated by the same procedure described in Example 1 and Example 2. As shown in Table 1, the dark decay, residual potential, $E_{1/2}$, and $E_{1/6}$ were determined to be 9.1 v/sec, −6.8 volts, 0.08 µJ/cm$^2$, and 0.21 µ/cm$^2$, respectively. Clearly, the 9.1-v/sec dark decay in this comparative example is substantially higher (i.e., inferior) compared to the 2.6-v/see dark decay measured from the photoreceptor comprised of ammonia-treated titanyl phthalocyanine in Example 1.

EXAMPLES 3–6

Examples 3–6, which are described in more detail below, illustrate the complexation-mediated crystal transformation process can also be performed by using alternative organic solvents in place of n-butyl ether.

EXAMPLE 3

The medium for effectuating the complexation-mediated crystal transformation in this example was NH$_3$/monochlorobenzene. 10 g of the ball-milled titanyl phthalocyanine was mixed with 90 ml of monochlorobenezene in a 250-ml flask fitted with a mechanical stiffer and a gas distributor. Crystal transformation was performed by constantly purging ammonia gas through the solution at a flow rate of about 300 cc./min. The reaction was continued for 10 hrs under vigorous stirring. The refined titanyl phthalocyanine was collected by filtration and successive washing with MEK. An identical XRPD pattern was observed for the titanyl phthalocyanine compared to that in Example 1.

5 g of the refined titanyl phthalocyanine, 28.6 g cyclohexanone solution of poly(vinyl butyral) (10 wt %), and 50 g of cyclohexanone were subjected to vigorous grinding in a sand mill device for 3 days. The resultant solution was then further diluted with 60 g cyclohexanone and 142.9 g MEK for use as the coating solution for the charge generation layer. The solid thin film containing the refined titanyl phthalocyanine dispersed in poly(vinyl butyral) was found to exhibit an absorption peak at 790 nm and an absorption shoulder at 705 nm. A photoreceptor was prepared using the same procedure as described in Example 1. The photoresponsive electrical properties of this photoreceptor so prepared are listed in Table 1 which indicate a dark decay of 5.1 v/sec, a residual potential of −13.2 volts, an $E_{1/2}$ of 0.09 µJ/cm$^2$, and an $E_{1/6}$ of 0.25 µJ/cm$^2$. An almost equal photosensitivity was achieved using the alternative solvent, monochlorobenzene, compared to that processed with NH$_3$/n-butyl ether as described in Example 1.

EXAMPLE 4

The medium for effectuating the complexation-mediated crystal transformation in this example was (an aqueous solution of NH$_3$)/monochlorobenzene. 10 g of the dry milled titanyl phthalocyanine was subjected to vigorous stirring in a paint shaker containing 10 g of saturated aqueous solution of ammonia (about 30 wt %) and 90 ml of monochlorobenzene. After a processing time of 10 hrs, the resultant product was filtered and washed successively with MEK. A similar XRPD pattern was obtained for the processed titanyl phthalocyanine compared to that in Example 2.

5 g of the refined titanyl phthalocyanine obtained above was then used to prepare a coating solution for the charge generation layer. 3.5 parts by weight of the refined titanyl phthalocyanine, 2 parts by weight of poly(vinyl butyral), 95 parts by weight of cyclohexanone, and 100 parts by weight of MEK were used to prepare the coating solution. Other factors such as compositions and thickness of the other layered members were kept the same as that described above. The solid thin film containing the processed titanyl phthalocyanine in poly(vinyl butyral) at a ratio of 3.5:2 by weight, was found to exhibit a strong absorption peak at 790 nm and an absorption shoulder around 705 nm. Photoresponsive electrical properties of the thus prepared photoreceptor were determined by PIDC and the results are shown in Table 1. The dark decay, residual potential, $E_{1/2}$, and $E_{1/6}$ were determined to be 5.4 v/sec, −12.7 volts, 0.10 µJ/cm$^2$, and 0.28 µJ/cm$^2$, respectively.

EXAMPLE 5

The medium for effectuating the complexation-mediated crystal transformation in this Example was NH$_3$/dichlorobenzene. 10 g of titanyl phthalocyanine that had been processed by dry milling and was placed in a 250-ml flask along with 80 ml dichlorobenzene. Ammonia gas was continuously distributed through the bottom of the flask, and, at the same time, the solution containing NH$_3$, dichlorobenzene and titanyl phthalocyanine was stirred vigorously with a mechanical stirrer. The reaction continued for 10 hrs, and then about 8 g of the refined titanyl phthalocyanine was collected after filtration and subsequent washing with MEK. The thus-processed refined titanyl phthalocyanine exhibited a similar XRPD pattern compared to that described in Example 1 and Example 3.

The optical absorption spectrum of the thus-processed titanyl phthalocyanine in poly(vinyl butyral) shows a strong absorption peak at 785 nm and a shoulder at 710 nm. An electrophotographic photoreceptor was prepared using the same procedure as described above. The dark decay, residual potential, $E_{1/2}$, and $E_{1/6}$ of the thus prepared photoreceptor were determined to be 2.7 v/sec, −23.4 volts, 0.10 μJ/cm$^2$, and 0.34 μJ/cm$^2$, respectively (see Table 1).

EXAMPLE 6

The medium for effectuating the complexation-mediated crystal transformation in this example was (an aqueous solution of $NH_3$)/dichlorobenzene. 10 g of the ball-milled titanyl phthalocyanine was mixed with 10 g of an aqueous solution of ammonia (~30 wt %) and 80 ml dichlorobenzene in a paint shaker. After vigorous stirring for 10 hrs, the product was collected by filtration and then washed successively with MEK (300 ml×3). The XRPD pattern shows identical Bragg diffraction peaks compared to that obtained in Example 2 and Example 4.

A coating solution for preparing the charge generation layer was prepared according to the above-mentioned preparation method. Electronic transition of the processed titanyl phthalocyanine dispersed in a matrix of poly(vinyl butyral) was characterized as having a strong absorption peak at 795 nm and a shoulder at 715 nm in the optical absorption spectrum. These absorption resonances are very close to those observed in the above examples, suggesting that the ammonia-refined titanyl phthalocyanines exhibit a similar electronic structure despite the different organic solvents used in the treatment process. Photoresponsive electrical properties of the thus prepared titanyl phthalocyanine were characterized as having a dark decay of 5.7 v/sec, a residual potential of −23.4 volts, an $E_{1/2}$ of 0.10 μJ/cm$^2$, and an $E_{1/6}$ of 0.33 μJ/cm$^2$ (see Table 1).

EXAMPLES 7–12

A butadiene-linked diamine compound (CT-405, purchased from Anan Corp.) was used as the charge transporting material. The structure of CT-405 is shown in FIG. 5. The charge generation materials used in Example 7–12 were the refined titanyl phthalocyanines described in Examples 1–6, respectively. Other factors, such as the composition and thickness of the layered members, were the same as in Example 1–6 so to allow their photoelectric properties to be compared.

EXAMPLES 13–18

Figure 6:
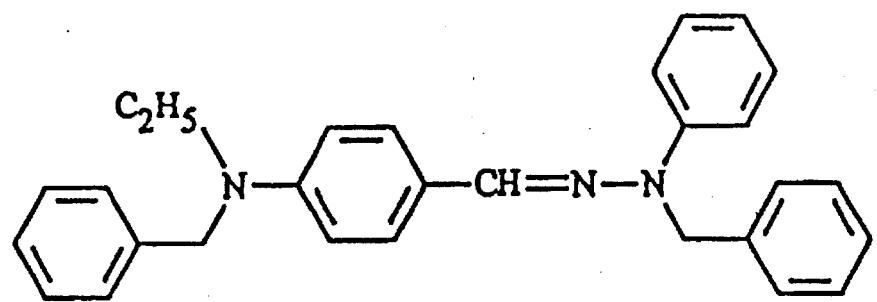
FIG. 6 shows the structure of yet another charge transporting material, hydrazone.

A hydrazone whose structure is shown in FIG. 6 was used as the charge transporting material. The charge generation materials in Example 13–18 were the refined titanyl phthalocyanines obtained in Example 1–6, respectively.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method to improve the charge generation efficiency of titanyl phthalocyanine comprising the step of subjecting said titanyl phthalocyanine to an ammonia-induced complexation-mediated crystal transformation so as to obtained an ammonia-modified titanyl phthalocyanine.

2. A method to improve the charge generation efficiency of titanyl phthalocyanine according to claim 1 wherein said step of ammonia-induced complexation-mediated crystal transformation is achieved by dispersing ammonia into a titanyl phthalocyanine-containing organic solution, which contains an organic solvent with said titanyl phthalocyanine dissolved therein, to form a mixture ant vigorously mixing said mixture to thereby cause an association of ammonia molecules with said titanyl phthalocyanine.

3. A method to improve the charge generation efficiency of titanyl phthalocyanine according to claim 2 wherein said ammonia is dispersed into said mixture by bubbling ammonia gas through said titanyl phthalocyanine-containing organic solution.

4. A method to improve the charge generation efficiency of titanyl phthalocyanine according to claim 2 wherein said ammonia is dispersed into said mixture by mixing an aqueous ammonia solution with said titanyl phthalocyanine-containing organic solution.

5. A method to improve the charge generation efficiency of titanyl phthalocyanine according to claim 4 wherein said aqueous ammonia solution is a saturated aqueous ammonia solution.

6. A method to improve the charge generation efficiency of titanyl phthalocyanine according to claim 4 wherein said aqueous ammonia solution contains about 30 wt % ammonia in water.

7. A method to improve the charge generation efficiency of titanyl phthalocyanine according to claim 4 wherein said titanyl phthalocyanine-containing organic solution and said aqueous ammonia solution are provided in a ratio between 1:10 and 10:1.

8. A method to improve the charge generation efficiency of titanyl phthalocyanine according to claim 4 wherein said titanyl phthalocyanine-containing organic solution and said aqueous ammonia solution are provided in a one-to-one ratio.

9. A method to improve the charge generation efficiency of titanyl phthalocyanine according to claim 2 wherein said titanyl phthalocyanine and said organic solvent are provided in a ratio from 1:1 to 1:50.

10. A method to improve the charge generation efficiency of titanyl phthalocyanine according to claim 2 wherein said titanyl phthalocyanine and said organic solvent are provided in a 1:10 ratio.

11. A method to improve the charge generation efficiency of titanyl phthalocyanine according to claim 2 wherein said organic solvent is an ether.

12. A method to improve the charge generation efficiency of titanyl phthalocyanine according to claim 2 wherein said organic solvent is selected from the group consisting of n-butyl ether, tetrahydrofuran, and ethylene glycol n-butyl ether.

13. A method to improve the charge generation efficiency of titanyl phthalocyanine according to claim 2 wherein said organic solvent is a halogen-containing hydrocarbon.

14. A method to improve the charge generation efficiency of titanyl phthalocyanine according to claim 2 wherein said organic solvent is selected from the group consisting of monochlorobenzene, dichlorobenzene, and dichloroethane.

15. A method to improve the charge generation efficiency of titanyl phthalocyanine according to claim 1 wherein said ammonia-modified titanyl phthalocyanine is characterized by having Bragg diffraction angles of 7.5, 9.3, 13.6, 14.3, 17.9, 24.0, 27.2, and 29.1 degrees, and vibrational absorption resonances at 1492 $cm^{-1}$, 1416 $cm^{-1}$, 1333 $cm^{-1}$, 1120 $cm^{-1}$, 1072 $cm^{-1}$, 962 $cm^{-1}$, 894 $cm^{-1}$, 752 $cm^{-1}$, and 731 $cm^{-1}$.

16. A method to improve the charge generation efficiency of titanyl phthalocyanine according to claim 1 wherein said ammonia-modified titanyl phthalocyanine is characterized by having Bragg diffraction angles of 7.4, 9.5, 11.6, 13.6, 14.3, 17.9, 24.0, 27.2, and 29.1 degrees, and vibrational absorption resonances at 1492 $cm^{-1}$, 1416 $cm^{-1}$, 1333 $cm^{-1}$, 1120 $cm^{-1}$, 1072 $cm^{-1}$, 962 $cm^{-1}$, 894 $cm^{-1}$, 752 $cm^{-1}$, and 731 $cm^{-1}$.

17. An ammonia-modified titanyl phthalocyanine obtained from a process which comprises the following steps:

(a) dissolving titanyl phthalocyanine in an organic solvent to form a titanyl phthalocyanine-containing organic solution; and (b) subjecting said titanyl phthalocyanine to an ammonia-induced complexation-mediated crystal transformation so as to obtain said ammonia-modified titanyl phthalocyanine.

18. An ammonia-modified titanyl phthalocyanine according to claim 17 wherein said ammonia-induced complexation-mediated crystal transformation step comprises the sub-step of bubbling ammonia gas through said titanyl phthalocyanine-containing organic solution.

19. An ammonia-modified titanyl phthalocyanine according to claim 17 wherein said ammonia-induced complexation-mediated crystal transformation step comprises the sub-step of adding an aqueous ammonia solution to said titanyl phthalocyanine-containing organic solution.

20. An ammonia-modified titanyl phthalocyanine according to claim 17 wherein said ammonia-modified titanyl phthalocyanine is characterized by having Bragg diffraction resonances at 7.5, 9.3, 13.6, 14.3, 17.9, 24.0, 27.2, and 29.1 degrees, and vibrational absorption resonances at 1492 $cm^{-1}$, 1416 $cm^{-1}$, 1333 $cm^{-1}$, 1120 $cm^{-1}$, 1072 $cm^{-1}$, 962 $cm^{-1}$, 894 $cm^{-1}$, 752 $cm^{-1}$, and 731 $cm^{-1}$.

21. An ammonia-modified titanyl phthalocyanine according to claim 17 wherein said ammonia-modified titanyl phthalocyanine is characterized by having Bragg diffraction angles of 7.4, 9.5, 11.6, 13.6, 14.3, 17.9, 24.0, 27.2, and 29.1, degrees, and vibrational absorption resonances at 1492 $cm^{-1}$, 1416 $cm^{-1}$, 1333 $cm^{-1}$, 1120 $cm^{-1}$, 1072 $cm^{-1}$, 962 $cm^{-1}$, 894 $cm^{-1}$, 752 $cm^{-1}$, and 731 $cm^{-1}$.

22. A photoreceptor for use in electrophotographic processes comprising a charge generating layer and a charge transporting layer, wherein said charge generating layer contains a ammonia-modified titanyl phthalocyanine which is obtained by a process which comprises the following steps:

(a) dispersing titanyl phthalocyanine in an organic solvent to form a titanyl phthalocyanine-containing organic solution; and (b) subjecting said titanyl phthalocyanine-containing organic solution to an ammonia-induced complexation-mediated crystal transformation so as to obtain said ammonia-modified titanyl phthalocyanine.

23. A photoreceptor for use in electrophotographic processes according to claim 22 wherein said ammonia-modified titanyl phthalocyanine is characterized by having Bragg diffraction angles of 7.4, 9.5, 11.6, 13.6, 14.3, 17.9, 24.0, 27.2, and 29.1 degrees, and vibrational absorption resonances at 1492 $cm^{-1}$, 1416 $cm^{-1}$, 1333 $cm^{-1}$, 1120 $cm^{-1}$, 1072 $cm^{-1}$, 962 $cm^{-1}$, 894 $cm^{-1}$, 752 $cm^{-1}$, and 731 $cm^{-1}$.

24. A photoreceptor for use in electrophotographic processes according to claim 22 wherein said ammonia-modified titanyl phthalocyanine is characterized by having Bragg diffraction angles of 7.5, 9.3, 13.6, 14.3, 17.9, 24.0, 27.2, and 29.1 degrees, and vibrational absorption resonances at 1492 $cm^{-1}$, 1416 $cm^{-1}$, 1333 $cm^{-1}$, 1120 $cm^{-1}$, 1072 $cm^{-1}$, 962 $cm^{-1}$, 894 $cm^{-1}$, 752 $cm^{-1}$, and 731 $cm^{-1}$.

25. An ammonia-modified titanyl phthalocyanine characterized by having Bragg diffraction angles of 7.5, 9.3, 13.6, 14.3, 17.9, 24.0, 27.2, and 29.1±0.2 degrees.

26. An ammonia-modified titanyl phthalocyanine according to claim 25 which is further characterized in having vibrational absorption resonances at: 1492 $cm^{-1}$, 1416 $cm^{-1}$, 1333 $cm^{-1}$, 1120 $cm^{-1}$, 1072 $cm^{-1}$, 962 $cm^{-1}$, 894 $cm^{-1}$, 752 $cm^{-1}$, and 731 $cm^{-1}$.

* * * * *